United States Patent
Smith et al.

(10) Patent No.: US 9,309,453 B2
(45) Date of Patent: Apr. 12, 2016

(54) CONSTRAINING PYRITE ACTIVITY IN SHALE

(71) Applicant: Smart Chemical Services, LP, Amarillo, TX (US)

(72) Inventors: Kevin W. Smith, Houston, TX (US); Jeffrey Snider, Dallas, TX (US); Jimmy Poindexter, Spring, TX (US)

(73) Assignee: Smart Chemical Services, LP, Amarillo, TX (US)

( * ) Notice: Subject to any disclaimer, the term of this patent is extended or adjusted under 35 U.S.C. 154(b) by 219 days.

(21) Appl. No.: 13/925,203

(22) Filed: Jun. 24, 2013

(65) Prior Publication Data

US 2013/0284427 A1 Oct. 31, 2013

Related U.S. Application Data

(62) Division of application No. 13/198,847, filed on Aug. 5, 2011, now Pat. No. 8,895,482.

(51) Int. Cl.
*C09K 8/22* (2006.01)
*C09K 8/68* (2006.01)
*C09K 8/54* (2006.01)
*C09K 8/035* (2006.01)
*E21B 43/26* (2006.01)

(52) U.S. Cl.
CPC . *C09K 8/54* (2013.01); *C09K 8/035* (2013.01); *C09K 8/68* (2013.01); *E21B 43/26* (2013.01); *C09K 2208/12* (2013.01)

(58) Field of Classification Search
None
See application file for complete search history.

(56) References Cited

U.S. PATENT DOCUMENTS

| | | | |
|---|---|---|---|
| 2,155,877 A | 4/1939 | Waldmann |
| 2,155,878 A | 4/1939 | Waldmann |
| 2,292,208 A | 8/1942 | DeGroote et al. |
| RE23,227 E | 5/1950 | Blair et al. |
| 2,520,102 A | 8/1950 | Tryon |
| 2,568,876 A | 9/1951 | White et al. |
| 2,647,125 A | 7/1953 | Gunderson |
| 2,761,835 A | 9/1956 | Brown |
| 2,761,836 A | 9/1956 | Brown |
| 2,846,440 A | 8/1958 | Hughes |
| 2,874,074 A | 2/1959 | Johnson |
| 2,894,908 A | 7/1959 | Newcombe et al. |
| 2,957,823 A | 10/1960 | Newcombe et al. |
| 2,995,520 A | 8/1961 | Luvisi et al. |
| 3,015,622 A | 1/1962 | Kwan-Ting |
| 3,017,351 A | 1/1962 | Scott et al. |
| 3,049,492 A | 8/1962 | DeGroote et al. |
| 3,098,727 A | 7/1963 | Martin et al. |
| 3,389,750 A | 6/1968 | Bohor et al. |
| 3,415,750 A | 12/1968 | Anzenberger |
| 3,454,095 A | 7/1969 | Messenger et al. |
| 3,578,781 A | 5/1971 | Abrams et al. |
| 3,687,847 A | 8/1972 | Maddox |
| 3,692,675 A | 9/1972 | Nimerick |
| 5,030,385 A | 7/1991 | Bartlett |
| 5,062,992 A | 11/1991 | McCullough |
| 5,082,576 A | 1/1992 | Howson |
| 5,322,630 A | 6/1994 | Williams |
| 5,459,125 A | 10/1995 | Ohlsen et al. |
| 5,591,701 A | 1/1997 | Thomas |
| 5,611,992 A | 3/1997 | Naraghi et al. |
| 5,634,984 A | 6/1997 | Van Slyke |
| 5,785,895 A | 7/1998 | Martin et al. |
| 6,328,943 B1 | 12/2001 | Roling et al. |
| 6,502,637 B2 | 1/2003 | Smith |
| 6,517,617 B1 | 2/2003 | Chartier et al. |
| 6,521,683 B1 | 2/2003 | Simmons et al. |
| 6,828,280 B2 | 12/2004 | England et al. |
| 6,926,836 B2 | 8/2005 | Fidoe et al. |
| 6,939,832 B2 | 9/2005 | Collins |
| 7,057,050 B2 | 6/2006 | Meyer |
| 7,268,100 B2 | 9/2007 | Kippie et al. |
| 7,392,847 B2 | 7/2008 | Gatlin et al. |
| 7,682,526 B2 | 3/2010 | Culley et al. |
| 7,851,414 B2 | 12/2010 | Yang et al. |
| 7,857,871 B2 | 12/2010 | Martin et al. |
| 2008/0039345 A1 | 2/2008 | Kippie et al. |
| 2009/0181867 A1 | 7/2009 | Yang et al. |

*Primary Examiner* — John J Figueroa

(74) *Attorney, Agent, or Firm* — Beck & Thomas, P.C.

(57) ABSTRACT

Degeneration of shale caused by oxygen in aqueous drilling, fracturing and completion fluids is minimized by introducing imidazolines modified so that they will be attracted efficiently to pyrites in the shale, thereby forming a protective coating on the pyrites. Inhibiting oxidation of the pyrites sharply reduces physical degradation of the shale, and the generation of undesirable oxides, in the presence of drilling, fracturing and completion fluids carrying oxygen. The imidazoline is an ionic salt of a monocarboxylic acid.

11 Claims, 1 Drawing Sheet

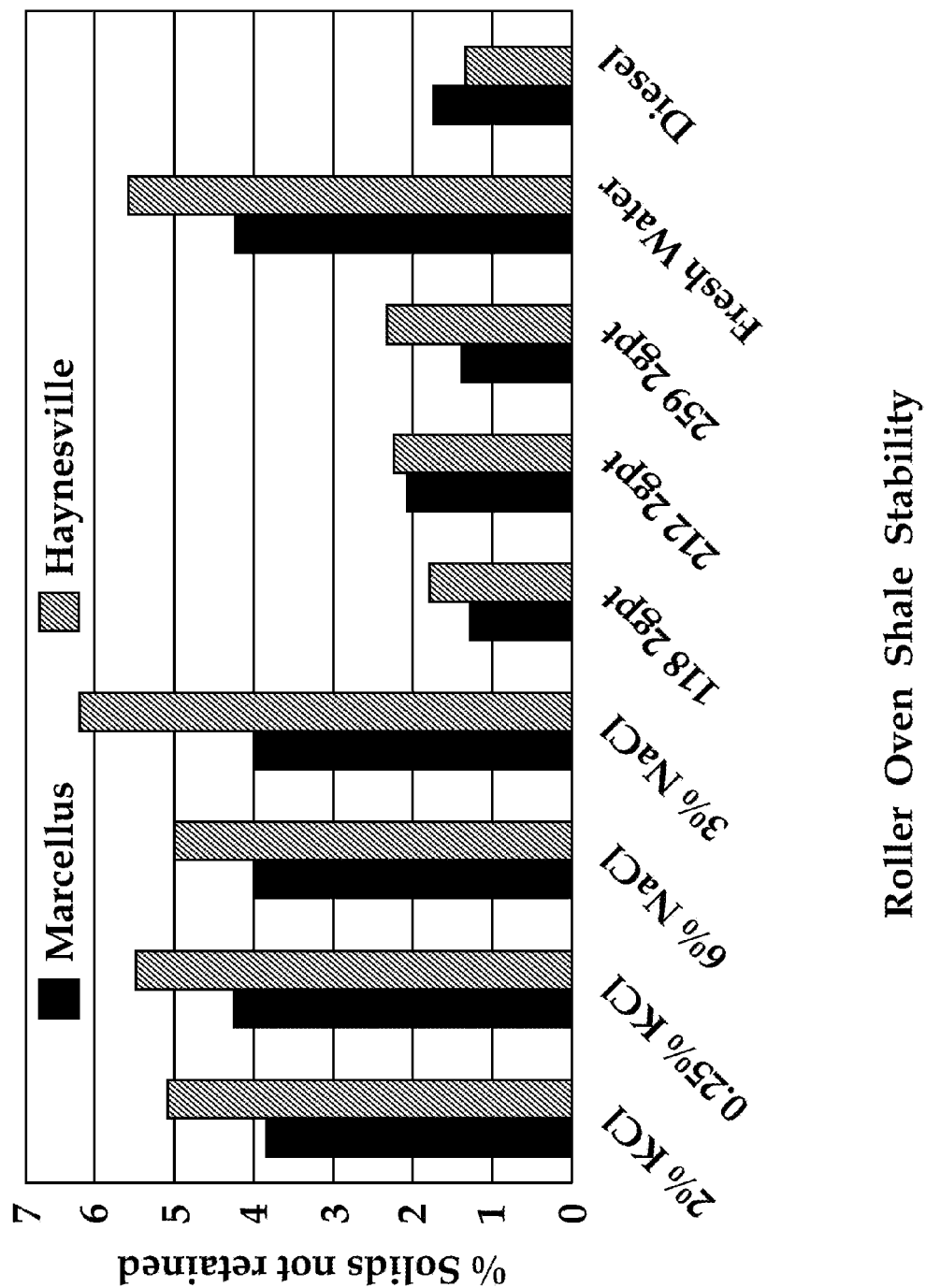

CONSTRAINING PYRITE ACTIVITY IN SHALE

CROSS REFERENCE TO RELATED APPLICATION

The present application is a divisional of U.S. Nonprovisional patent application Ser. No. 13/198,847, filed Aug. 5, 2011. The prior application is incorporated by reference herein.

TECHNICAL FIELD

In the recovery of hydrocarbons from the earth, degeneration of shale caused by oxygen in aqueous drilling, fracturing and completion fluids is minimized by introducing imidazolines modified as betaines or ionic salts so that they will be attracted efficiently to pyrites in the shale, thereby forming a protective coating on the pyrites. Inhibiting oxidation of the pyrites sharply reduces physical degradation of the shale in the presence of drilling, fracturing and completion fluids carrying oxygen.

BACKGROUND OF THE INVENTION

We have observed that, because of the normal operation of the pumps and other equipment used to place aqueous drilling fluids, workover fluids and fracturing fluids in wells, it is almost impossible to avoid including significant amounts of air in the fluid. While some of the oxygen may be dissolved, most of it remains in gaseous form. Oxygen in the air carried into the formation oxidizes the iron pyrites present on the surface of the shale in contact with the drilling or fracturing fluid. Chemical oxidizers in the form of gel breakers and biocides can also introduce oxygen into the fluid. When sulfur is released from the iron pyrite through oxidation of the iron pyrite, it tends to combine with other multivalent metals present in the formation, causing highly undesirable compounds to enter the produced fluids. Oxidation of iron pyrite not only results in troublesome sulfates of metals such as barium, calcium, and strontium, but also can generate iron oxides which will precipitate in the circulating fluid, causing deposits in piping, pumps and machinery, and even find its way into the produced hydrocarbons. Even very small amounts of iron in the oil or gas can be detrimental to catalysis and other processing steps for the hydrocarbon product. Moreover, after oxidation of iron pyrite, the mobility of both the iron and the sulfur from the previously situated iron pyrite is physically destructive to the shale.

Oxygen is almost always present in drilling, fracturing, and other aqueous well treatment fluids in amounts of at least 1%, generally in the range of 3% to 10% by volume; the actual volume of gaseous oxygen, and the portion dissolved, are functions of the pressure and temperature and to an extent the turbulence of the flow.

In the past, oxygen scavengers have been used to try to reduce the amount of dissolved oxygen that will react downhole. The most common oxygen scavengers, however, ammonium bisulfite and sodium bisulfite, both introduce free sulfate to the reservoir, where there is typically an excess of barium, strontium and calcium ionically bound to the substrate. Depending on their solubility constants and the common ion effect, the barium, strontium and calcium will more or less readily combine with the free sulfate to create water-insoluble scale.

It has recently become clear that virtually all shales encountered in drilling and fracturing operations, either in the recovery of oil or of natural gas, contain from 0.1% to 15% by volume iron pyrite distributed throughout. See, for example, John Kiefer and Warren H. Anderson "Foundation Problems and Pyrite Oxidation in the Chattanooga (Ohio) Shale, Estill County, Kentucky, Kentucky Geological Survey, University of Kentucky. Kiefer and Anderson have shown the detrimental effects of pyrite oxidation on the foundation of a building. When drilling through shale or an extended reach lateral (a horizontal wellbore in the shale that reaches out from the vertical wellbore) in the shale, similar shale stability problems are encountered. Wellbore stability in the shale is critical for successful drilling into any shale formation. If the shale loses its structural strength, the wellbore can collapse around the drill pipe, and in severe cases the hole being drilled must be abandoned along with the downhole equipment and the drill pipe. Because of ground stress, the action of water used in the drilling process, and wellbore pressures, shale stability problems are significantly greater in hydrocarbon recovery compared to the foundation problems encountered by Kiefer and Anderson. A typical reaction between pyrite and water is presented as $2FeS_2 + 3H_2O + 3CaCO_3 + 6O_2 \rightarrow FeCa(SO_4) + CO_2 + Fe$. This paper deals with disintegration of shale around the foundation of a building, and thus does not involve a drilling or fracturing fluid, but the effects of oxygen studied is significant for drilling and fracturing operations. In part because of the abundance of pyrite in the shale, the described decomposition of the iron pyrite contributes significantly to the undesirable structural disintegration of the shale which plagues hydrocarbon recovery operations throughout the industry. Oxygen reacts both with iron and sulfur, causing rapid disintegration of the pyrite.

Since oxygen, both dissolved and undissolved (which together we call "free oxygen"), in the drilling or fracturing fluid is unavoidable, the damage caused by oxidation of iron pyrite alone can be very significant, resulting not only in the production of undesired multivalent metal compounds, but also, because the iron sulfide is a significant part of the shale, its molecular disruption significantly weakens the structure of the shale, exacerbating any independent hydration effects.

There is a need to cure the problem of formation damage following from the oxidation of iron pyrite in shale.

As will be seen below, a group of imidazoline derivatives has been found effective for constraining the degradation of shale and clay by inhibiting the oxidation of iron pyrite in the shale and clay. The reader may therefore be interested in reviewing the 1958 patent to Bohor et al, U.S. Pat. No. 3,389,750, describing the use of high molecular weight imidazolines to control formation damage in waterflooding practices. The Bohor patent lists some imidazoline derivatives, such as 1-hydroxyethyl-2-hexadecenyl imidazoline; 1-diethyl-diamino-2-pentadecenyl imidazoline, 1-triethyltriamino-2-heneicosenyl imidazoline, 1-hydroxypropyl-2-octadecenyl imidazoline, and 1-hydroxypropyl-2-pentadecenyl imidazoline. Generally, these materials can be made by the reaction of an ethylene polyamine with a carboxylic acid. Imidazolines within a general imidazoline structure where the 1 position is occupied by a group of the formula $-(CH_2CH_2NH)_m C_2H_4NH_2$ and the 2 position is occupied by a hydrocarbon group derived from a straight chain fatty acid and containing from about 14 to about 22 carbon atoms, and a number of other imidazolines are attributed to DeGroote et al in U.S. Pat. No. 3,049,492, who recommend them for controlling sulfate-reducing bacteria in oil recovery methods. Even earlier, White et al, in U.S. Pat. No. 2,568,876, described the use of various imidazolines, for example the reaction products of oleic acid with tetraethylenepentamine, and, separately with diethylenetriamine, as corrosion inhibitors.

SUMMARY OF THE INVENTION

Our method involves the formation of a protective hydrophobic coating on the iron pyrite exposed to possible contact with a drilling fluid or fracturing fluid unavoidably containing infused oxygen. The protective coating is accomplished by deploying imidazoline groups on the iron of the pyrite exposed to the fluid. Because the imidazoline group has two nitrogens, at least one of which is further polarized by modifying groups which we place on it, it is readily attracted to, and by, the iron in the pyrite. Further, the imidazoline group has a relatively flat configuration, which enhances the attraction. But imidazoline by itself—unmodified—is not water soluble or otherwise amenable to placement on a remote shale surface.

We have found that if the imidazoline is modified in the manner of our invention, it can not only be dispersed in a manner that its deposition on the pyrite is assured, but it will also form a hydrophobic layer on the shale, further protecting the shale from water and oxygen damage. It is important in our invention that the mechanism for inhibiting shale disintegration is the shielding of iron pyrites from oxygen in the water. While water hydration of other portions of the shale is inhibited by our protective coating, the main effect of our invention is the prevention of oxidation of iron pyrites by oxygen transported by and infused into the drilling or fracturing fluid when it is pumped. The sulfur in the pyrite is thus constrained from combining with other multivalent metals such a barium, strontium and calcium. And, iron oxides are not created to cause problems in the system. The shale is stabilized because oxygen is not permitted to contact the plentiful iron pyrite.

The hydrophobic coating we construct inhibits the contact of pyrite deposits by the fracturing fluid, thus preventing contact of the pyrite with oxygen carried by the fluid, thus preventing the formation of undesirable sulfates and iron compounds. The pyrite is retained more or less in its original form during drilling, and the shale is also protected against damage by the water. Fracturing fluids are thus able to perform their primary functions of fracturing and transporting proppant without undue concern about the degeneration of the shale formation and the gratuitous generation of di- and trimetallic sulfates or itinerant iron compounds. Drilling fluids are able to perform their primary function of transporting drill cuttings to the surface, also without fear of damaging the shale surrounding the well.

Unmodified imidazoline is substantially water-insoluble and accordingly is difficult to use in an aqueous drilling or fracturing fluid. Imidazoline placed in water will simply form into hydrophobic ball-like bodies and will resist placement anywhere. Since imidazoline is not soluble in water, it does not behave as an ionic salt. By carefully selecting the reactants for making our imidazoline derivatives, we create ionic salts from these entirely organic materials. The modifications we introduce to the imidazoline molecule are designed to render it dispersible rather than soluble.

In particular, we can accomplish our objective of protecting the shale by including in a drilling fluid, a fracturing fluid, or other well treatment fluid a pyrite control additive comprising (a) an imidazoline of the formula

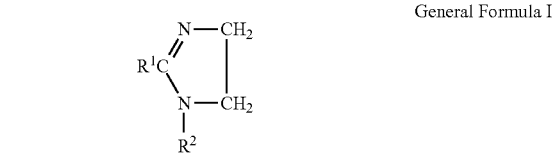

General Formula I where $R^1$ is H or a linear alkyl, or mono- or diunsaturated alkyl or alkylene group of 1-22 carbon atoms, $R^2$ is $-(CH_2CH_2NH)_nCH_2CH_2R^3$ where n is 0-5, and $R^3$ is either OH or $NH_2$, and (b) a linear carboxylic acid having from 1 to 22 carbon atoms in a molar ration of (a) to (b) of 1:10 to 10:1.

BRIEF DESCRIPTION OF THE DRAWINGS

FIG. 1 shows graphically the results of roller oven tests of the invention in the presence of various materials.

DETAILED DESCRIPTION OF THE INVENTION

To demonstrate the vulnerability of pyrite-containing shale (virtually all hydrocarbon-bearing shale) to dissolved oxygen, experiments were run comparing the contents of various constituents in oxygenated and deoxygenated water after rinsing samples of shale. Shale samples were ground in air for the oxygenated water runs and in argon for the deoxygenated runs. Each rinse represents 60 milliliters of the designated water having been passed through 60 grams of sample.

TABLE I

|  | Ox Water | Ox rinse 1 | Ox rinse 2 | Ox rinse 3 | Ox rinse 4 | Ox rinse 5 | Ox rinse 6 | Ox rinse 7 | Ox rinse 8 |
|---|---|---|---|---|---|---|---|---|---|
| Iron | 3.98 | 7.57 | 12.4 | 6.64 | 10.4 | 8.95 | 5.98 | 5.72 | 3.83 |
| Magnesium | 1.47 | 1.77 | 2.11 | 1.74 | 1.85 | 1.85 | 1.26 | 1.27 | 0.914 |
| Barium | 0.656 | 1.06 | 5.04 | 0.863 | 3.12 | 1.6 | 1.39 | 0.821 | 0.697 |
| Potassium | 31.1 | 29 | 35.5 | 44.5 | 29.1 | 26.2 | 22.5 | 23.4 | 22.8 |
| Sodium | 1200 | 494 | 278 | 192 | 94.3 | 60 | 41.1 | 29.5 | 20.6 |
| Strontium | 3.08 | 1.22 | 1.09 | 1.17 | 0.644 | 0.56 | 0.488 | 0.563 | 0.623 |
| Silica | 26.4 | 45.2 | 48.5 | 47.4 | 58.1 | 59 | 34.4 | 35.7 | 21.8 |
| Calcium | 20 | 12 | 14.9 | 12.5 | 11.3 | 9.4 | 8.32 | 8.37 | 9.15 |
| Aluminum | 6.39 | 12.3 | 13.7 | 13.5 | 17.4 | 17.8 | 10.3 | 10.9 | 6.38 |
| Chloride | 1820 | 790 | 537 | 444 | 203 | 126 | 102 | 92.6 | 89.4 |
| Sulfate | 214 | 78.6 | 37.8 | 24.2 | 22.7 | 19.3 | 15.6 | 16.4 | 15.6 |
| Total Alkalinity | 232 | 192 | 169 | 145 | 155 | 138 | 126 | 110 | 100 |
|  | Deox Water | Deox Rinse 1 | Deox Rinse 2 | Deox Rinse 3 | Deox Rinse 4 | Deox Rinse 5 | Deox Rinse 6 | Deox Rinse 7 | Deox Rinse 8 |
| Iron | 0.422 | 0.483 | 0.331 | 0.867 | 0.407 | 0.208 | 0.306 | 0.402 | 0.434 |
| Magnesium | 0.231 | 0.33 | 0.539 | 0.813 | 1.02 | 1.78 | 2.25 | 1.21 | 0.934 |
| Barium | 0.103 | 0.136 | 0.188 | 0.325 | 0.382 | 0.609 | 0.732 | 0.328 | 0.235 |

TABLE I-continued

| | | | | | | | | |
|---|---|---|---|---|---|---|---|---|
| Potassium | 7.52 | 10.9 | 16 | 28.3 | 33.3 | 50.4 | 57.8 | 34.8 | 26.8 |
| Sodium | 543 | 338 | 247 | 172 | 118 | 70 | 42.7 | 20.7 | 11.4 |
| Strontium | 0.653 | 0.533 | 0.709 | 1.12 | 1.42 | 2.24 | 2.67 | 1.18 | 0.811 |
| Silica | 10.7 | 7.23 | 9.03 | 10.1 | 5.39 | 3.56 | 3.46 | 5.74 | 6.64 |
| Calcium | 5.17 | 5.8 | 6.61 | 11.6 | 13.4 | 22.7 | 27.1 | 13.8 | 10 |
| Aluminum | 2.13 | 1.46 | 2.18 | 3.23 | 1.12 | 0.497 | 0.52 | 1.3 | 1.7 |
| Chloride | 676 | 492 | 440 | 395 | 386 | 381 | 381 | 184 | 114 |
| Sulfate | 43.1 | 19.5 | 11 | 7.9 | 7 | 5.9 | 6.9 | 8.4 | 8.2 |

Results are shown in parts per million of the constituents in Table I. Notably, the iron content of the deoxygenated rinse water is consistently substantially lower than that of the oxygen-containing water. The shale apparently absorbs sulfate, which appears to be generated when the pyrite is oxygenated.

A class of compositions encompassed within General Formula I, in an aqueous carrier, may be said to have the structural formula

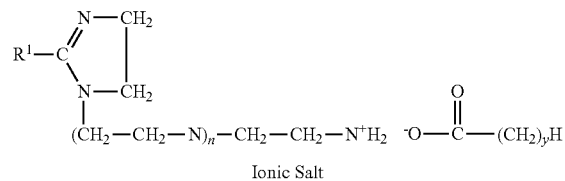

Ionic Salt

Formula II where $R^1$ and n are as defined above, and y is 0 or an integer from 1 to 21. We refer to this charge separated class of materials as ionic salts. As the structural formula implies, the ionic salt of Formula II is in a molar ratio of 1:1, but an excess of either component (a) or (b) is not undesirable—rather, it can sometimes further facilitate the dispersion of the pyrite control additive in the well treatment fluid.

Another class of materials within General Formula I may be said to have the structural formula

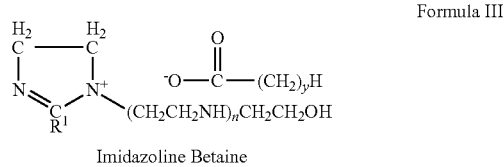

Imidazoline Betaine

Formula III

Where $R^1$, n and y are as defined above. In this case the dissociated carboxylic acid has a charge separation orientation with the nitrogen in the 1 position in the imidazoline ring. As we depict this nitrogen in the (+) onium form, the dissociated complex is called a betaine, although the more generic term "ionic salt" is still applicable.

A specific ionic salt within Formula II useful in our invention is made by first conducting the following reaction:

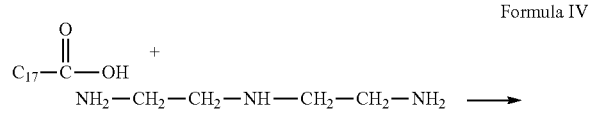

Formula IV

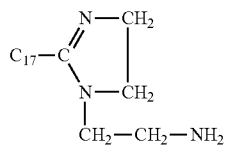

Water is also produced. In this illustration, the fatty acid may be oleic acid. Oleic acid is a major constituent of tall oil, sometimes called tall oil fatty acid, or TOFA, which may be used instead. Tall oil includes linoleic acid and palmitic acid, which also could be used by themselves. Thus the long chain fatty acid may be saturated or unsaturated; linoleic acid is diunsaturated.

To this material, which may be called 1-ethylamino 2-oleyl imidazoline, is added acetic acid in a molar ratio of 1:10 to 10:1.

If the diethylene triamine is replaced with triethylene tetramine and the oleic acid is replaced with butyric acid, the resultant imidazoline product is

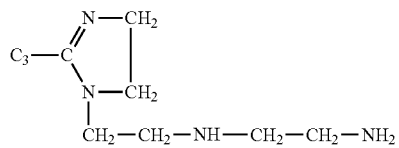

The polyamine may have from 3 to 6 amine groups, as implied by General Formula I. The carboxylic acid forming the ionic salt at the terminus of the 1-position may be formic or any acid having up to 20 carbon atoms.

Generally, the reactions of carboxylic acids and polyamines to make imidazolines are well known. Variations and conditions for the reactions may be found, for example, in White et al U.S. Pat. No. 2,568,876, which is hereby incorporated entirely and specifically herein by reference. Monocarboxylic acids which may be used include (as examples) formic acid; acetic acid; propionic acid; butyric acid; pentanoic (valeric) acid; hexanoic acid; octanoic (caprylic) acid; decanoic acid; dodecanoic (lauric) acid; tetradecanoic (myristic) acid; heptadecanoic acid; octadecanoic (stearic) acid; oleic acid, linoleic acid; linolenic acid, palmitic acid, and docosanoic (behenic) acid.

A modified roller oven test was conducted to determine the effect of our additive on the contents of various components of the effluents from the samples. As is known in the art, the roller oven shale stability test simulates the circulation effect of the fluid around ground rock particles over a period of 16-24 hours at a desired temperature and studies the reduction of particle size due to mechanical attrition and reaction of shale particles with the reacting fluids.

In the modified API RP 13i procedure used in these studies, the shale was ground to a particle size less than 2 mm (10 mesh) and larger than 0.425 mm (40 mesh). These particles were split equally using a spinning Riffler, then distributed equally into 10 gm samples. The number of samples depends on the number of fluids to be tested. The weighed sample was placed in a glass bottle along with 50 ml of fluid and allowed to roll in a roller oven at a desired temperature. Following the aging, the samples were screened through a 70 mesh screen (0.269 mm) and washed with fresh water prior to drying and reweighing.

FIG. 1 shows the results of the modified roller oven tests, comparing two materials of our invention to other materials. The material designated "118" is Formula IV above made with tall oil (arbitrarily $C_{17}$, a major constituent) neutralized with acetic acid to achieve a pH of 8.5, and the material designated "259" is Formula II (also made with tall oil) above neutralized with butyric acid, also brought to a pH of 8.5. The term "gpt" means gallons per 1000 gallons. Percentages are by weight in water.

Table 2 is a comparison of the analysis of effluent from samples using fresh water and our additive ("118") in the same water. Neither the fresh water nor the water containing "118" was deoxygenated. The composition of "118" was as stated in the next previous paragraph, having a pH of 8.5. Based on the amount of sample passed through the 70 mesh screen, the "118" treated samples were far more stable than the untreated ones.

TABLE 2

Sample ID: 118 RO Effluent

| Parameter | Result | Units | Result | Units | Ratio-118:Fresh |
|---|---|---|---|---|---|
| Aluminum | 14000 | µg/L | 14 | mg/L | 0.17 |
| Barium | 1520 | µg/L | 1.52 | mg/L | 0.47 |
| Calcium | 72700 | µg/L | 72.7 | mg/L | 0.40 |
| Iron | 31000 | µg/L | 31 | mg/L | 0.22 |
| Potassium | 21000 | µg/L | 21 | mg/L | 0.63 |
| Magnesium* | 13300 | µg/L | 13.3 | mg/L | 0.32 |
| Sodium | 145000 | µg/L | 145 | mg/L | 0.97 |
| Silica | 31000 | µg/L | 31 | mg/L | 0.17 |
| Strontium | 1400 | µg/L | 1.4 | mg/L | 0.98 |
| Chloride | | | 145 | mg/L | 1.00 |
| Sulfate | | | 15.2 | mg/L | 0.42 |

Sample ID: Fresh Water RO Effluent

| Parameter | Result | Units | Result | Units |
|---|---|---|---|---|
| Aluminum | 82300 | µg/L | 82.3 | mg/L |
| Barium | 3210 | µg/L | 3.21 | mg/L |
| Calcium | 182000 | µg/L | 182 | mg/L |
| Iron | 141000 | µg/L | 141 | mg/L |
| Potassium | 33400 | µg/L | 33.4 | mg/L |
| Magnesium | 41600 | µg/L | 41.6 | mg/L |
| Sodium | 150000 | µg/L | 150 | mg/L |
| Silica | 182000 | µg/L | 182 | mg/L |
| Strontium | 1430 | µg/L | 1.43 | mg/L |
| Chloride | | | 145 | mg/L |
| Sulfate | | | 36.5 | mg/L |

*Result less than reporting limit

Note
the iron content of the "118" containing water was 22% of the effluent using fresh water; also the sulfate content was 42%.

An aqueous drilling fluid for use in our invention will comprise water, 0.1% to 5% by weight of an imidazoline of general formula I, and a small amount (0.1% to 0.5% by weight) of a viscosity-enhancing (Bingham plastic inducing) polymer. Examples of Bingham plastic inducing polymers are xanthan gum, hydroethylcellulose, carboxymethyl guar, starches, carboxymethylcellulose and/or other natural or synthetic polymers and their derivatives. The Bingham plastic (viscosity-enhancing) additive provides gel strength to assist in removing drill cuttings and other solids in the fluid In addition to 0.1% to 5% by weight imidazoline of the General Formula I, an aqueous fracturing fluid will comprise water and up to 24 pounds per gallon (0.1 to 24 ppg or more) of a proppant such as sand or any other effective proppant for assuring the formation fractures remain open, and frequently a viscosifying agent.

Generally, lower molecular weight modified imidazolines are more useful for fracturing fluids as they are better able to penetrate and contact the large surface areas opened up during the fracturing process. Generally, the higher molecular weight modified imidazolines are more useful in drilling fluids, where the longer alkyl or alkenyl chains will contribute a lubricity effect in addition to the shale protective effect. However, it should be understood that shale compositions vary considerably as do the conditions of any well operation, and we do not intend to be limited to high or low molecular weight compositions for any particular type of operation, although some may be more effective, as a matter of degree, than others in particular circumstances.

The lubricity effect was demonstrated by comparing two materials of our invention to tap water and an oil based mud sample, in a Baroid Lubricity Meter. The Baroid Lubricity Meter is a device that uses a rotating metal ring against a fixed block. The test sample is placed in a metal bowl, then used to immerse the metal ring and the block. After turning on the machine motor and adjusting the rotation to 60 rpm, a torque meter is used to apply a load of 150 lbs-inch to the rotating metal ring. Readings from the torque meter are taken after one, three and five minutes. The average of the torque meter readings is then used to calculate the lubricity coefficient. Here, the samples were tested using metal to metal and metal to sandstone contacts. Results are presented in Tables 3 and 4:

TABLE 3

Metal to Metal Lubricity Coefficients

| Sample | Lubricity Coefficient |
|---|---|
| Tap Water | 0.283 |
| Oil Based Mud #2 | 0.145 |
| Formula A | 0.084 |
| Formula B | 0.088 |

TABLE 4

Metal to Sandstone Lubricity Coefficients

| Sample | Lubricity Coefficient |
|---|---|
| Tap Water | 0.279 |
| Oil Based Mud #2 | 0.128 |
| Formula A | 0.073 |
| Formula B | 0.075 |

Formulas A and B were two different samples of a proposed mud containing 1% by weight oleyl imidazoline in water also containing 3% by weight potassium chloride and weighted with 10 pounds per gallon barite. The performance of Formulas A and B were considered excellent.

The invention claimed is:
1. Method of inhibiting the oxidation of iron pyrite present in shale by free oxygen in an aqueous well treatment fluid containing free oxygen comprising (1) adding to said well treatment fluid an ionic salt derived from (a) an imidazoline of the formula

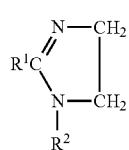

where $R^1$ is H or a linear alkyl, or monounsaturated or diunsaturated alkyl or alkenyl group of 1-22 carbon atoms, $R^2$ is —$(CH_2CH_2NH)_nCH_2CH_2NH_2$ and n is 0-5, and (b) a linear monocarboxylic acid having from 1 to 22 carbon atoms in a molar ratio of (a) to (b) of 1:10 to 10:1, and (2) contacting said shale with said well treatment fluid.

2. Method of claim 1 wherein said linear monocarboxylic acid (b) comprises oleic acid.

3. Method of claim 1 wherein said linear monocarboxylic acid (b) comprises acetic acid.

4. Method of claim 1 wherein $R^1$ comprises a residue of carboxylic acid having 16-19 carbon atoms and carboxylic acid (b) comprises acetic acid.

5. Method of claim 1 wherein $R^1$ comprises a residue of a carboxylic acid having 16-19 carbon atoms and carboxylic acid (b) comprises butyric acid.

6. Method of claim 1 wherein said ionic salt is added to said fluid in an amount to provide 0.1% to 5% by weight of said imidazoline in said fluid.

7. Method of claim 1 including adding to said fluid 0.1% to 2% by weight of a viscosity enhancing polymer.

8. Method of claim 1 wherein said imidazoline satisfies the formula

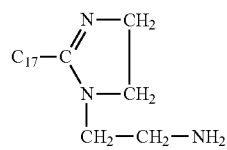

and said ionic salt is added to said fluid in an amount effective to form a protective layer on iron pyrite in said shale.

9. Method of claim 1 wherein ionic salt has the formula

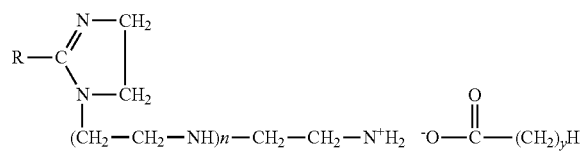

where R is a residue of a carboxylic acid containing 1 to 22 carbon atoms, n is 0 to 5, and y is 0 to 21.

10. Method of claim 9 wherein n is 1 and y is 0.

11. Method of claim 9 wherein R is derived from tall oil.

* * * * *